Fig. 1

COMPOSITION DIAGRAM
MOLE FRACTION

United States Patent Office 3,812,048
Patented May 21, 1974

3,812,048
OXYGEN PROCESS PELLETS
Lester G. Massey, Moreland Hills, Ohio, and Paul B. Tarman, Elmhurst, and Jack Huebler, Deerfield, Ill., assignors to Consolidated Natural Gas Service Co., Inc., Cleveland, Ohio
Filed Apr. 7, 1972, Ser. No. 241,957
Int. Cl. C01b 13/08
U.S. Cl. 252—186
36 Claims

ABSTRACT OF THE DISCLOSURE

Special oxygen acceptor compositions in pellet form for the production of oxygen in a modified Brin-type process, and method for the production of the pellets. The compositions comprise a physical mixture of finely ground dolomitic quicklime and barium peroxide (DQL-$BaO_2$) preferably pelletized in a dry process not employing binders. The pellets have high crushing strength which permits larger reactor size. At the same time, the pellets have good porosity which permits use of relatively large size pellets which exhibit low pressure drop without loss of activity. The pellets show very long life (over 40,000 cycles) without disintegration, and without loss of chemical activity. Typical operation is at 1–200 p.s.i.a. and 1300–1600° F. The pellets exhibit increased strength after use. In contrast to fluidized bed operation using powder mixtures, the active $BaO_2$ in pelleted form with DQL cannot plate out in use. The pellets of this invention are relatively insensitive to humidity in preparation, shipment and storage. In addition to increased oxygen production per mole of barium peroxide and reduction in cycle times, a significant reduction in the amount of barium oxides required to produce oxygen at any given rate is exhibited by the pelleted compositions.

Field of the invention

This invention relates to specific pellet forms of oxygen acceptor compositions for use in producing oxygen and enriching air by so-called oxygen "absorbing" processes, such as modified Brin-type processes and methods of pelletizing those compositions. More specifically, the invention relates to pelletizing compositions made by mixing various dolomitic quicklimes with barium peroxide. These compositions greatly enhance the activity of barium peroxide in such processes and provide faster reaction rates and better gas conversions. The compositions per se and processes for their use are the subject of our copending application filed of even date herein, Ser. No. 242,153.

Background of the invention

Chemical proceses of the Brin-type for the production of oxygen, which include the enrichment of air by increasing its total oxygen content above the approximately 21% found in air, are based on the 1851 discovery by Boussingault that barium oxide, when heated a dull red, "absorbs" oxygen, and when heated to higher temperature gave off the "absorbed" oxygen. This led to the first commercial production of oxygen starting in about 1881 and continuing for about 20 years by the Brin brothers of France. As described in the Brin British patent of 1885, No. 157, they used a three-step process which involved first the removal of $CO_2$ from air, then passing the dried $CO_2$ free air through or over a retort of baryta (barium oxide, BaO) at a temperature of 500–600° C. (932° F.– 1112° F.) to "absorb" oxygen, and third, the oxygen was withdrawn from the barium oxide by a vacuum creating means. The temperature ordinarily was raised to about 800° C. (1472° F.) during the third stage. This gave rise to what is commonly known as the heat cycle variation of the Brin process. A complete cycle took from three to four hours.

In the Brin British patent of 1885, No. 151, the manufacture of the barium oxide used in the process of the No. 157 patent was described. A "nitrate of baryta" was heated to a high temperature of from 1000–1500° C. in a closed vessel and was then cooled in a vacuum to produce the baryta.

The Jensen British patent of 1880, No. 1416, was another Brin process patent in which compressed air was used in the retorts. This gave rise to the pressure cycle variation of the Brin process. The use of air pressure apparently ensured a complete and uniform "absorption" of oxygen in the entire mass of the barium oxide. In this process, the temperature was for economic reasons maintained relatively constant. Although authorities differ as to the exact pressure used, it has been variously reported that the air was forced in at a pressure of from 10 to 15 pounds or 25 to 30 p.s.i.a., while the oxygen was drawn off under a vacuum of 13 to 14 pounds or 1 p.s.i.a. While the cycle time was relatively short, being reported to be on the order of about ten minutes, the output was low.

More recently, Squires patent No. 3,324,654 shows a Brin-type process for the simultaneous production of oxygen and power wherein the compressed air is let down through an expansion turbine to recover energy values in the compressed air. The oxygen "absorbing" bed is a solid composed of an intimate intermingling of tiny crystallites of barium oxide and magnesium oxide. In the process, the bed must be mixed periodically.

Recently, Moriarty, in "The Effects of Catalytic or Promotor Oxides on the Brin Process," Proc. Iowa Acad. Sci., 77, 360–78 (Apr. 10, 1971), reported on studies of 18 different oxides in chemical oxygen producing processes. BaO was mixed (apparently in binary mixtures) with the following oxides: $La_2O_3$, MgO, $Fe_2O_3$, CoO, CuO, CdO, $SiO_2$, $CeO_2$, $Al_2O_3$, ZnO, NiO, CaO, SrO, $Ag_2O$, $MnO_2$, PbO, HgO and $Na_2O_2$. The oxides were employed in powdered mixtures or prepared from "wet" co-precipitates and thereafter dried. There was no report of attempts by Moriarty to use any of his materials in large beds suitable for continuous, long, life, commercial operation.

In the Squires patent, the bed material crystallites are prepared from a co-precipitated barium carbonate and magnesium carbonate mixture, which is pelletized with active carbon and, optionally, a starch paste binder. These pellets are dried and heated to 1200° F. under a CO atmosphere to decompose the magnesium carbonate to form MgO, and then further heated to 1700° F. under N to "react" the carbon with the $BaCO_3$. The preparation of Squires' pellets is thus relatively long, complicated and expensive.

It is generally the case that gas-solid contact-type packed-bed processes work best where the solid is finely divided, but improvements sought by increasing the fineness of the solid are gained only at the expense of increased energy expended in the movement of the gas through the solid. Since progress in the useful arts relates to commercial practicability in both its economic and technical aspects, where the energy expense to move the gas becomes too great, processes using finely powdered solids are considered commercially inoperative. Criteria of feasibility include the amount of pressure drop, $\Delta P$, through the solid; where $\Delta P$ is small, the process tends to be feasible from the point of view of energy consumption, and where $\Delta P$ is large, the process may be too expensive or even inoperative.

One solution to reducing the pressure drop is to increase the size of the solids, usually by pelletizing. In addition to decreasing activity, pelletizing has other disadvantages, for example, the reactor size is greatly increased. In addition, pellets tend to bridge in the reactor, causing voids and uneven flow distribution. Another problem with pellets occurs in connection with their crushing strength. If the pellets are weak, the pellets at the bottom of the reactor tend to crush under the weight of the solid pellets above, forming a powder. The pellet bed then becomes plugged by the powder, and the pressure drop increases to unfeasible values. In processes requiring periodic or continuous mixing of the pellets, they tend to become broken or abraded, and the bed plugged by the resultant broken pieces or powder.

If the pellet strength is attempted to be increased, as by increased pelletizing pressure or by using binders, pores in the pellet tend to become closed and the interior of the pellet is no longer available to enter into the process. Further, binders often adversely affect the reactivity of the solids and thus cannot be used. In some cases, binders deteriorate in use and the pellets become friable with age causing bed plugging. Where pore forming agents are attempted to be used, they tend to reduce crushing strength.

The entire problem is complicated where the solid is a multicomponent material, and matters of activity, strength, porosity, aging, density, friability, and inactivation by binders, become unpredictable. Further, in the Brin-type processes, the oxygen "absorbing" BaO solids are affected by moisture, and BaO-containing pellets would disintegrate or become inactivated by manufacture, storage, or use in a humid environment.

In spite of the many variations in the Brin processes which have been tried in the last century, there is today no practical bed material of a form suitable for substantial commercial production of oxygen or enrichment of air involving the use of barium oxides. Many industrial processes employ oxygen or oxygen enriched air, for example, steel making, glass making, aerobic fermentation processes, sewage treatment and various combustion processes. There is thus a significant need for a reliable and economical bed material for chemical processes of oxygen production, or of enrichment of air with oxygen.

THE INVENTION

Objects

It is among the objects in this invention to provide an improved oxygen acceptor bed material in a form suitable for commercial processes for the production of oxygen and enrichment of air with oxygen.

It is another object of this invention to provide an improved bed material for oxygen enrichment processes of the chemical type employing barium oxides.

It is another object to provide improved pellet forms of oxygen acceptor compositions and a process for the manufacture of the pellets.

It is another object of this invention to provide a pellet form of an oxygen acceptor composition which has a relatively infinite lifetime in terms of cyclic reuse, and yet which is relatively simple to make, inexpensive, and can be shipped and stored under relatively adverse conditions.

It is another object of this invention to provide a pellet of a mixture comprising barium peroxide and dolomitic quicklime, which pellet has a good porosity, high density, high activity, and high crushing strength, and yet which is relatively insensitive to degradation by water vapor and inactivation by exposure to ambient atmospheric $CO_2$ under ordinary precautions.

It is another object of this invention to provide a process for preparing pellets from commercially available materials and pelleting machines, which have high crushing strength without the use of binders.

Still other objects of this invention will become evident from reading the following description.

Summary of the invention

We have discovered that a mixture of a compound of the oxides of magnesium and calcium such as finely ground dolomitic quicklime (hereinafter DQL) and $BaO_2$ can be formed into a high strength porous pellet suitable for use in a commercial oxygen producing process or air enrichment process. The pellet shows substantially no loss of activity over long operating periods.

Surprisingly, the pellets of this invention exhibit no loss of crushing strength as they age in process operation. Rather, the pellets increase in strength upon heat tempering. Further, although barium oxides have a tendency to plate out of loose powder mixtures at high temperatures, on the order of those in the oxygen processes here involved, 1300–1600° F., the barium oxides show no plating out of the pellets of this invention.

Our copending application, Ser. No. 242,153 filed of even date herewith, discloses and claims the discovery that DQL greatly enhances the activity of barium oxides in Brin-type processes. In that application, we disclose that physical mixing of finely ground barium peroxide with DQL increases the activity of barium oxides in both the oxidation and reduction halves of the cycle. The weight percent DQL useful in such mixtures ranges from 1–92%. The particle size of the barium peroxide is preferably in the range of smaller than about 100 mesh. The DQL particle size is below about 40 mesh, preferably smaller than about 80 to 100 mesh. We also disclose therein that the DQL may be derived from a variety of naturally available dolomites, but the dolomites must be calcined under conditions which insure that the final carbonate content of the DQL-$BaO_2$ mixtures are such that the mole ratio of carbon dioxide to barium peroxide is less than 1.0. DQL itself is inactive yet promotes the activity of the barium oxides. Faster reaction rate and better gas conversions are obtained by the use of DQL-$BaO_2$ compositions. The addition of DQL is therein disclosed to increase the oxygen production per mole of barium peroxide more than tenfold. The disclosure of that application, Ser. No. 242,153, is incorporated by reference herein.

An important aspect of this invention is the discovery that common binding agents can nullify the activity of the pellets. While some binder may be used, we prefer to use no binder at all since we have discovered that DQL-$BaO_2$ mixtures are evidently self-binding. We have discovered that high strength, porous, long life pellets of the DQL-$BaO_2$ powder mixture may be dry formed without binder using standard pelltizing apparatus at ambient temperatures. The pellets have high mean, green crushing strength, on the order of from about 25–90 lbs., typically about 40–60 lbs., and can be used as such directly without preactivation or heat treatment such as required by the prior art. Optionally, the pellets may be heat-tempered before use, and such pellets typically are stronger than green pellets, having a mean tempered crushing strength on the order of about 30–100 lbs., typically 55–80 lbs. The mean green crushing strength of the pellets of this invention are from 3–12 times greater than typical catalyst pellets used in commercial operations today.

Another important aspect of the invention is the fact that the pellets of this invention may be made high density, yet retain sufficient porosity to be completely active throughout, and have strength to prevent crushing and bed plugging. This also permits the pellets to be made large enough that the pressure drop is not excessive. Generally, the pellets should not be so large that they are in part inactive. Pellets of this invention have a density in the range of from about 90 to 160 lbs./cu. ft., and typical cylindrical pellets may range in size from $\frac{1}{16}''$ x $\frac{1}{16}''$ to 1" x 1".

Preferably the pellets of this invention have a density in the range of 120–150 lbs. cu. ft. and are cylinders with a diameter of ³⁄₁₆" to ⅝" and a length of ³⁄₁₆" to ⅝".

Typical operating conditions for production of oxygen using the pellets of this invention are 1–50 p.s.i.a. at 1350–1600° F. during the reduction (oxygen production) half of the cycle, and 40–200 p.s.i.a. at 1300–1550° F. during the oxidaton half of the cycle. Pellets of this invention have been processed through over 40,000 cycles, enriched air from normal 21% up to 30.75% on the average. Shut-downs do not affect pellet activity.

Another aspect is the use of barium peroxide instead of barium oxide in the pellets with the DQL. The use of the barium peroxide significantly improves oxygen activity and greatly minimizes the likelihood of hydration (formation of barium hydroxide through absorption of water), and carbonation (formation of barium carbonate) during preparation and storage of the pellets. We have found that one source of inactivity and reduction in lifetime of barium monoxide bed materials is due to hydration and carbonation. For example, barium monoxide exposed for 23 hours on a laboratory balance pan gained 175 percent over its original weight; barium peroxide, on the other hand, gained no measurable weight in 192 hours of continuous exposure. Thus, we provide the initial pellets with the barium in an oxidized state as $BaO_2$, and processes using the pellets should always be shut down in a manner to assure that the barium is in the peroxide state.

The pellets of this invention may be used with any of the Brin-type processes, whether they be of the basic Brin-type, the thermal or pressure cycle type processes, or of the more recent energy recovery modification as set forth in Squires 3,324,654. Our preferred mode of operation with the pellets of this invention is to produce oxygen-enriched air by cyclicly varying pressure at relatively constant temperature, so that the barium oxide in the bed is oxidized to barium peroxide using relatively high pressure air, and the barium peroxide is reduced to barium oxide using lower pressure air. The oxygen can be withdrawn substantially pure or mixed with the purging lower pressure air, thereby consistently enriching its oxygen content to as much as 40%. The oxygen or enriched air may be used in all combustion processes, in the production of iron, steel, and glass, and in chemical processing such as synthesis gas production, sewage treatment, stream aeration, oxygen pyrolysis of municipal solid waste to produce fuel gas, and the like. While fixed bed processes are preferred, the pellets are strong enough, particularly when tempered, to be useful in processes calling for periodic or continuous mixing, movement or fluidizing of the bed.

The DQL-$BaO_2$ pellets of this invention may have various forms. Although we presently prefer cylindrically shaped pellets, we may also use spheres, discs, or prisms of square, triangular or rectangular cross section. Other geometric or irregular shapes may be used, such as tubular or toroidal shapes, so long as the criteria of activity, strength and porosity, as set forth herein, are met. The pellets of this invention may also be used as a starting material from which to prepare fluidized bed material. Green or tempered pellets are crushed and screened to a size distribution suitable for fluidized bed operations with no tendency for $BaO_2$ to plate out from the mixture during fluidized operation. To improve the distribution of the Ba, Mg and Ca components in the fluidized bed particles, the once-ground pellet particles may be repelletized and recrushed to the desired size distribution.

The invention is described in more detail below with reference to the following figures of which.

In the following detailed description, the examples are by way of illustration and not by way of limitation. As used herein, conversion percentage is defined as a fraction of the maximum theoretical change in weight for the barium peroxide in the mixture, where the purity of the original barium peroxide is assumed to be 100 percent.

Detailed description and examples

Mixtures from which the pellets of this invention may be prepared may be derived from various sources of dolomitic quicklime and barium peroxide. It is critical, however, to the activity of the initial, pre-pelleting mixtures that the carbon dioxide/barium peroxide mole ratio be below 1.0, as set forth in our copending application Ser. No. 242,153 since we have found that the cyclic conversion drops to 0 as the carbon dioxide/barium oxide mole ratio approaches 1.0.

Typically, the dolomitic quicklime may be obtained from commercial sources (such as the Marblehead Lime Company or Pfizer Chemical Company) as derived from a natural, domestic dolomite. As received, the dolomite has a large particle size on the order of from 1 to 2" in diameter, and may contain more or less than the critical $CO_2$ content. These large particles may then be processed by calcining in a gas-fired tunnel kiln at temperatures of between 1900–2000° F. for a period of four hours to form DQL. This product should be unslaked. The kiln product is then crushed to below ¼" in a jaw crusher, and then to below about 40 mesh, preferably below 80 to 100 mesh in a hammer mill. Optionally, the DQL may be purchased commercially and, if necessary, crushed to the appropriate mesh size. The DQL should be assayed for $CO_2$ content after calcining and crushing, or upon receipt in the case of commercial DQL, to insure meeting the criteria for the final mixture. The $CO_2$ content can be controlled by adjusting the length and temperature of the calcining schedule.

The $BaO_2$ is also commercially available (e.g., Barium & Chemicals, Inc. or Baker Chemical Co.), and is preferably below about 100 mesh. Technical or reagent grade $BaO_2$ are satisfactory, but more crude forms may be obtained and purified by known processes. BaO may be employed, but must be converted to $BaO_2$ to maintain the activity, integrity and stability of the mixture with DQL. The $BaO_2$ should be routinely assayed to determine that its $CO_2$ content is low enough to assure negligible loss of activity. Where the $CO_2$ content is high, the $BaO_2$ may be heated to from about 850–950° C. to drive off the $CO_2$. If the $BaO_2$ is melted or becomes sintered, it must be reground to the desired mesh. $BaO_2$ is also available as a hydrated $BaO_2 \cdot 8H_2O$, which evolves the hydrated water at 100° C. Anhydrous $BaO_2$ is preferred, and as referred to herein, $BaO_2$ means anhydrous $BaO_2$.

Pellet mixtures may have weight ratios of DQL/$BaO_2$ of from about 11.5 to 0.01. Particularly preferred are ranges of from 9 to 0.42, i.e., from about 90 weight percent DQL to 30 weight percent DQL, the remainder to 100 weight percent of the mixture being $BaO_2$. The examples below refer to a mixture of weight ratio 4.0 (80/20 weight ratio DQL/$BaO_2$) or 2.3 (70/30 DQL/$BaO_2$) as noted.

Typically, pellets are prepared at ambient temperature in a Komarek-Greaves, Model B220 rotary briquetting machine (pelleter) employing 35 tons roller pressure, to which is fed the DQL-$BaO_2$ mixture which may contain from 0 to about 30 weight percent of a suitable inert binder. Preferably, the pellets are prepared without any binder whatsoever. The pellet forming dies may be of any desired shape, and unless otherwise noted, cylindrical shapes were tested below. The pellets are warm to the touch after being formed, on the order of 120–160° F., and need not be heated to complete their preparation. Compaction pressure was calculated to be about 19,800 p.s.i. Initially the pellets may be ⅜″ diameter by 3″ long, and are broken in a chopper into granule pellets which pass through a ¼″ screen. Fines are then screened out, and the recovered pellets are ready for use.

While we do not wish to be bound by theory, we believe that the high, mean green strength of the pellets may be be due in part to the lower melting point of $BaO_2$ (about 790° C.; erroneously reported as 450° C. in handbooks), as compared to BaO (1923° C.). At the compacting pressures used, above about 2500 p.s.i., and preferably from 2500 to 125,000 p.s.i., rapid compacting can produce temperatures on interfaces between the DQL and $BaO_2$, or between adjacent $BaO_2$ particles sufficiently high to promote a monolayer welding of the particles to each other at their contact surfaces. The resulting pellet, while being a mixture and retaining porosity, tends to be monolithic. Because the materials, DQL and $GaO_2$ are dissimilar and DQL acts as a heat sink, any "melting" does not progress far enough to eliminate voids, which would render the pellet nonporous.

EXAMPLE 1

In this example, various types of binders were tested to see what effect, if any, they would have on the activity of the $DQL$-$BaO_2$ mixtures. The activity was determined in runs in a standard thermobalance (thermogravimetric balance) of the following general construction. The sample pellet was contained in a porous (wire screen) basket, which is suspended in a heated reaction zone by a wire attached to a weight-sensitive transducer located in the upper, colder portions of the reactor. Gas of the desired composition is passed over the suspended sample, reacting with it and changing its weight. The transducer transmits these weight changes to a recorder producing a continuous weight record which can be used to determine the particular reaction rate being studied. With a thermobalance, it is possible to continuously monitor the weight change due to the reaction of a solid sample, and by simple calculation determined the conversion percent and/or rate.

The preparation of the pellets was as follows. For Run 1, a slurry of an 80/20 mixture of $DQL$-$BaO_2$ in 25.9% benzene by weight was prepared and hand extruded at a pressure of below 100 p.s.i. into a cylindrical pellet, which was dried 12 hours at 85° C. to drive off the benzene. The pellet was extremely fragile, crumbling upon handling.

For Run 2, an 80/20 $CaO$-$BaO_2$ mixture was mixed with 2.9% by weight graphite and slugged once in a large die. The partly compacted mixture was then fed into a Stokes Model B–2 pelleting machine to form cylindrical pellets of ¼″ diameter x ¼″ length at pressures in excess of 50,000 p.s.i.

For Run 3, an 80/20 mixture of $MgO$-$BaO$ was mixed with 9.7% by weight stearic acid as a binder, and ½″ x ½″ cylindrical pellets were prepared in a Parr Instrument Co. hand press at 4800–5500 p.s.i.

For Run 4, a 50/50 $BaCO_3$-activated carbon mixture was pelleted with 1% stearic acid binder to produce a ½″ x ½″ cylindrical pellet in the same press as used in Run 3. The pellet was heated one hour at 1900° F. under an $N_2$ atmosphere to react the $BaCO_3$ with the activated carbon.

Run 5 duplicated the Squires-type pellet of U.S. Pat. 3,324,654 as follows: A solution of $(NH_4)_2CO_3$ in water containing 58 g. of $(NH_4)_2CO_3$ was added to a solution containing 1.3 g. of activated carbon (A.C.) in suspension, 26 g. $(Ba(NO_3)_2$, and 51 g. $Mg(NO_3)_2 \cdot 6H_2O$ with vigorous stirring. The precipitated mixture of $BaCO_3$-$MgCO_3$ and activated carbon was filtered in a Büchner funnel with vacuum and washed with $H_2O$. The cake was dried for one hour at 100° C. The $BaCO_3$-$MgCO_3$-C mixture was then pelletized in the Parr hand-operated pellet press used in Run 3. The pellets weer further dried at 100° C. for one and one-half hours. These raw pellets contain $BaCO_3$/$MgCO_3$/A.C. in a weight ratio of 52.08/44.47/3.45. The raw pellets were then placed in a tubular furnace and heated to 1250° F. for four hours in a continuous stream of CO. The temperature of the furnace was then raised to 1775° F. The pellets were heated at this temperature for two hours in a continuous stream of nitrogen. Furnace temperature was then lowered to 1300° F. and the pellets were heated at that temperature for two hours under a stream of air and nitrogen in ratio of ½. The pellets shrank upon heating, indicating non-uniform compaction or only surface compaction.

For Run 6, 80/20 mixtures of $DQL$-$BaO_2$ were pelleted in a Buehler Ltd. specimen mount press to form ¼ x ¼ cylindrical pellets at 2500–100,000 p.s.i.

Table 1 below shows the results of the series of runs on various types of binders, the activity values being the approximate percent as compared to an 80/20 $DQL$-$BaO_2$ powder of size —80 +230 mesh, as the standard of 100% activity.

TABLE 1.—EFFECT OF BINDER ON PELLET ACTIVITY

| Run | Acceptor | Binder Type | Amount, percent | Relative activity, percent |
|---|---|---|---|---|
| 1 | $DQL$-$BaO_2$(80/20) | Benzene | 25.9 | 95–100 |
| 2 | $CaO$-$BaO_2$(80/20) | Graphite | 2.9 | (¹) |
| 3 | $MgO$-$BaO$(80/20) | Steric acid | 9.7 | (¹) |
| 4 | $BaCO_2$-A.C.³(60/40) | do | 1.0 | (¹) |
| 5 | $BaCO_3$-$MgCO_3$-A.C. ² (52.08/44.47/3.45) | None | N.A. | 25–40 |
| 6 | $DQL$-$BaO_2$ | do | N.A. | 100 |

¹ No activity.  ² A.C. means activated carbon.

As can be seen from the runs above, we prefer to use no binder whatsoever to preserve high levels of activity. High pelletizing pressures should be used when benzene is employed, and safety precautions must be employed. We think that the graphite in Run 2 may have acted in part as a lubricant and closed the pores of the pellet, as well as inactivating the barium due to $CO_2$ formation at cycle temperature. Thus, while we greatly prefer no binders due to the self-binding nature of the $DQL$-$BaO_2$, a binder may be used as long as it does not substantially inactivate the $DQL$-$BaO_2$ mixture.

EXAMPLE 2

This example shows the green crushing strength of various types of pellets. The $DQL$-$BaO_2$ pellets were prepared from an 80/20 mixture devoid of binder in an F. J. Stokes, Model A3, mechanical tablet machine, at pressures in excess of about 50,000 p.s.i. To test crushing strength, a load was applied either radially across the diameter of the pellet, or axially along its length, between two jaws. The mean load required to crush the number of pellets tested is reported in pounds of force.

TABLE 2.—CRUSHING STRENGTH OF CYLINDRICAL PELLETS

| Pellet description | Load direction | Number tested | Size, inches diameter x length | Mean load, lb. |
|---|---|---|---|---|
| $DQL$-$BaO_2$: | | | | |
| "Green" | Axial | 10 | ¼″ x ¼″ | 59 |
|  | Radial | 10 | ¼″ x ¼″ | 39 |
| Tempered ¹ | Axial | 5 | ¼″ x ¼″ | 78 |
|  | Radial | 5 | ¼″ x ¼″ | 56 |
| Commercial nickel catalyst ² | Axial | 5 | ¼″ x ¼″ | 7 |
| Squires-type¹:³ | | | | |
| Raw ⁴ | do | 3 | ½″ x ³⁄₁₆″ | 26 |
| Finished ⁵ | do | 2 | ½″ x ³⁄₁₆″ | 18 |

¹ Pellet dropped into thermobalance at 1,450° F. at 80 p.s.i.g. ran 18 cycles over four hours.
² Compaction pressure unknown, but estimated >50,000 p.s.i.
³ $BaCO_3$-$MgCO_3$-A.C., as in Run 5, Example I.
⁴ Before heat treating, not ready for use.
⁵ After heat treating as in Run 5 Example I, ready for use.

As can be seen from Table 2, the mean axial and radial crushing strength of binder-free, green $DQL$-$BaO_2$ pellets is surprisingly high. The green pellets of this invention are ready for use without further preparation. By way of comparision, a typical nickel catalyst used in chemical processes today (Harshaw catalyst Ni 0104), having a published crushing strength of 12 lbs. was also tested, as shown in Table 2. This catalyst had a mean axial crushing strength of 7 lbs. Likewise, Squires-type pellets were tested and found to have mean axial crushing strength of about 18 lbs. The green pellets of this invention thus range from over 3.2 to 8.4 times as strong in the axial direction as the Squires pellet or the typical nickel catalyst pellet.

Table 2 also shows the increase in crushing strength of pellets of this invention upon use-tempering. The pellets were tempered by heating in the thermobalance at 1450° F. and cycled at 80 p.s.i.g. air in the oxidation half, and 2 p.s.i.g. air for the reduction half of the cycle The pellets were thus tempered by running for 18 cycles during four hours. The mean axial crushing strength of the tempered pellet increased from 59 to 78, an increase of almost 33%. Likewise, the radial crushing strength increased from 39 lbs. to 56 lbs., an increase of 43.5%. The freshly prepared green pellets are generally white in color, whereas the tempered pellets tend to be grayish-white.

In contrast, the Squires-type pellets were stronger raw than finished, i.e., after heating to decompose the carbonates. The raw pellets were grey in color, and the finished pellets were cream colored, but the centers had sunk from the heating and reaction of carbonate with carbon.

Increased pellet strength is important in that the pellets of this invention, upon continued use, will not become friable, producing dust which would plug the bed and increase the pressure drop across and through the bed. In a typical fifteen-foot high reactor, there is from 100 to 250 tons of bed material placed in the reactor. The load on the pellets at the bottom of the reactor would be upwards of 10 lbs. The pellets of this invention clearly would not be crushed under such loads. Indeeed, larger beds may be used without the danger of the pellets becoming crushed under the bed loading.

To further show the unexpectedness of the strength of the pellets of this invention, the axial crushing strength of ¼″ diameter green pellets of DQL-BaO$_2$ were comparison tested in accordance with Table 3. To show the suitability of DQL-BaO$_2$ mixtures for pelletizing in various types of equipment, these pellets were prepared in a Buehler Ltd. hydraulic specimen mount press under compression of 62,000 p.s.i.

TABLE 3.—AXIAL CRUSHING STRENGTH OF CYLINDRICAL GREEN PELLETS

| Pellet description | Number tested | Size, inches, diameter x length | Mean load, lb. |
| --- | --- | --- | --- |
| Barium peroxide, alone | 8 | ¼″ x ¼″ | 56 |
| Dolomitic quicklime, alone | 12 | ¼″ x ¼″ | 64 |
| 20% BaO$_2$/80% DQL | 9 | ¼″ x ¼″ | 76 |

As can be seen by comparing the values for barium peroxide alone and dolomitic quicklime alone, the mean loads of each are respectively 56 and 64 lbs. It would be expected that a mixture of the barium peroxide and DQL would give a value of approximately 60 lbs. for the axial crushing strength. However, the value tested for these pellets of an 80/20 DQL-BaO$_2$ mixture is 76 lbs. rather than the weighted average of the two components, 62 lbs.

EXAMPLE 3

Thermobalance tests were conducted on a series of 80/20 DQL-BaO$_2$ mixture cylindrical pellets to investigate the effect of pellet size, porosity and density on the oxidation and reduction rates. The pellets used in these tests were prepared in a Buehler Ltd. specimen mount, hydraulic press so that the density could be carefully controlled. As noted from the table below, pellet densities of between 94 and 147 lbs./cu. ft. were tested. While the theoretical density of an 80/20 DQL-BaO$_2$ mixture is 228 lbs./cu. ft., the actual density of the powder used (an 80/20 mixture of DQL-BaO$_2$ in which the BaO$_2$ was —100 mesh and the DQL was —200+325 mesh) is 90 lbs./cu. ft. A low pellet density of 94 lbs. was tested and higher values up to 147 lbs./cu. ft. were tested. Pure BaO$_2$ powder was also run by way of comparison. Table 4 below lists the effect of pellet size and porosity on oxygen productivity for these mixtures for five runs varying from powder size to up to ½″ pellets. In these runs, the oxidation pressure was 80 p.s.i.g. air, and the reduction pressure 2 p.s.i.g. air at a temperature of 1450° F.±15° F. The weight of each pellet was measured, and the volume calculated from the diameter and height of the pellet. The density was derived by standard calculation of the weight divided by the volume. In addition, the porosity, P, was determined as a fraction of the theoretical density of 228 lbs./cu. ft. by the formula:

$$F = 1 - (\text{pellet density/theoretical density})$$

Figure 2:
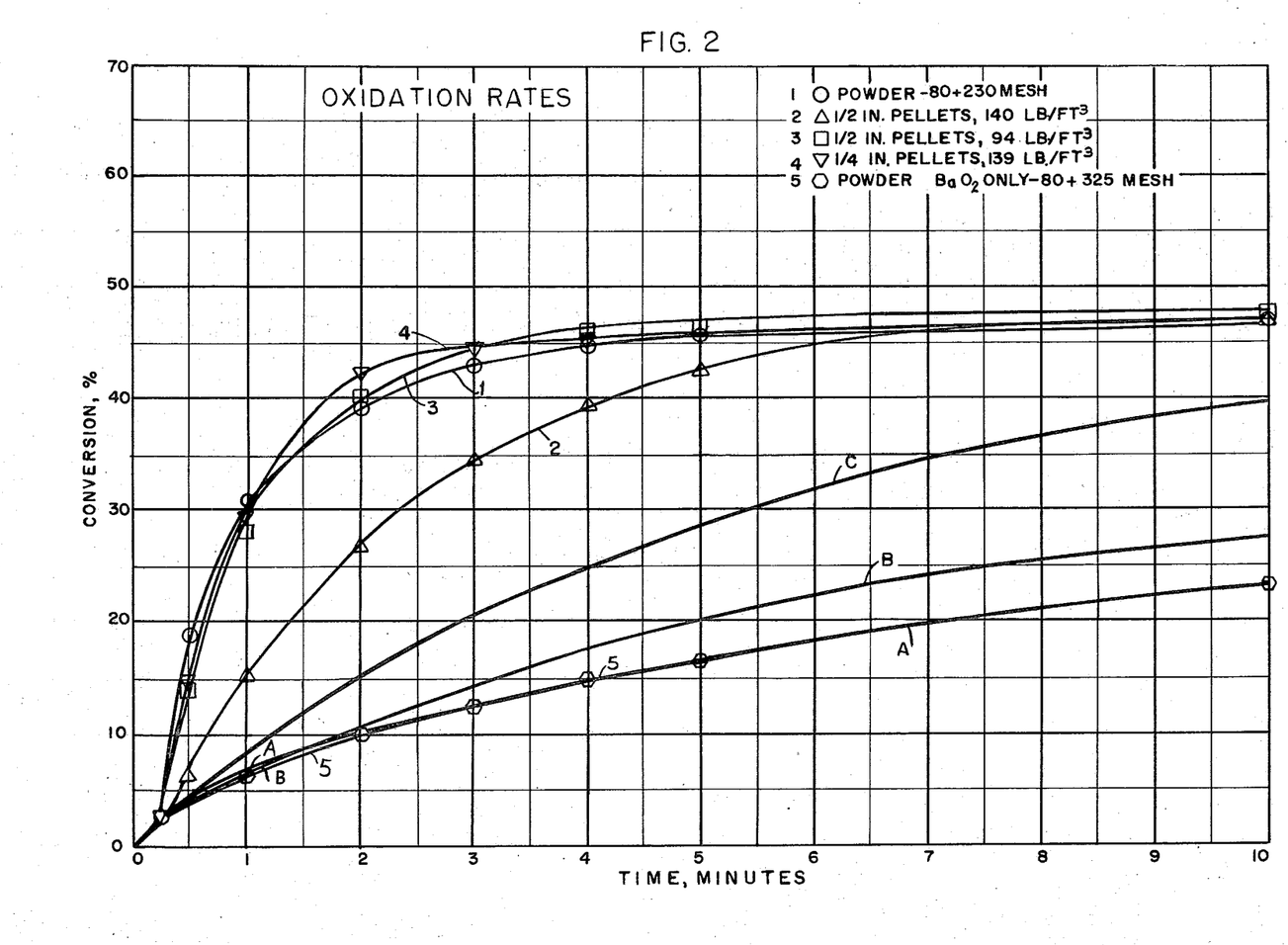
FIG. 2 graphically illustrates oxidation conversion percentage as a function of time of various pellets, and shows regions of preferred activity rates for pellets of this invention.

TABLE 4.—PROPERTIES OF MATERIALS USED IN CONVERSION STUDIES OF FIGURE 2

| | Material | | | | |
| --- | --- | --- | --- | --- | --- |
| | DQL-BaO$_2$ (80/20) | | | BaO$_2$ | |
| Run number | 1 | 2 | 3 | 4 | 5 |
| Pellet size | (a) | ½ x ½ | ½ x ½ | ¼ x ¼ | (a) |
| Diameter, inch | 0.50 | 0.500 | 0.500 | 0.222 | 0.5 |
| Height, inch | 1.56 | 0.525 | 0.480 | 0.266 | 1.56 |
| Volume, in.$^3$ | 0.306 | 0.103 | 0.094 | 0.010 | 0.306 |
| Surface area, in.$^2$ | 2.842 | 1.217 | 1.146 | 0.263 | 2.84 |
| Compaction pressure, p.s.i. | N.A. | 51,000 | 3,000 | 101,000 | N.A. |
| Density, lb./ft.$^3$ | 90 | 140 | 94 | 139 | 90 |
| Porosity, percent b | 0.605 | 0.386 | 0.588 | 0.390 | 0.605 | a Powder.
b Based on theoretical density of 228 lb./ft.$^3$ for 80/20 mixture.

FIG. 2 is a graphical representation of the oxygen conversion percentage vs. time, of Runs 1–5. This graphically demonstrates that as pellet density increases, the oxidation rate decreases; compare low density Run 3 with higher density Run 2, curves 3 and 2, respectively, in FIG. 2. Further, smaller pellets of high density (Run 4, curve 4) have a greater rate and higher conversion than the ½″ pellets of the same density (Run 2, curve 2). Also, large pellets of low density have approximately the same reaction as the DQL-BaO$_2$ powder. Indeed, the conversion percentages for all the Runs 1–4 are excellent, as compared to powdered BaO$_2$ (—80+325 mesh) run by itself, Run 5, illustrated as curve 5, the lowest curve in FIG. 2. After ten minutes, BaO$_2$ Run 5 shows a maximum conversion of less than 50% of any one of the pellet Runs 1–4. This figure also illustrates the great improvement of the mixture of DQL-BaO$_2$ (Run 1, curve 1) as compared to the BaO$_2$ alone (Run 5, curve 5); the runs are compared since both are in the same, powdered state. In comparing Runs 2–5 (curves 2–5) with Run 1 (curve 1), it is evident that pellets of this invention are comparable to the DQL-BaO mixture in activity over a broad range of pellet size and densities. The pellets have the distinct advantage of lower pressure drop through a bed, without substantial loss of activity.

Surprisingly, the ¼″ pellets of high density have a sufficiently high porosity that the oxidation rates are extremely good. The small dense pellets (140 lb./ft.$^3$) afford a somewhat better reaction rate than the large low density pellets (94 lb./ft.$^3$), leading to about 50 percent less reactor volume for the same conversion percentage. Under the same operating conditions the pressure drop occasioned by the decrease in size of pellets does not affect the conversion percentage of rate as shown in FIG. 2. In contrast, pellets of size smaller than 1/16″ in diameter of this order of densities may exhibit such high pressure drop that they could render the energy requirements of the process unacceptable.

FIG. 2 also helps illustrate standards of composition and pells activity, curves A-C. In order to compare various pellets and composition, a standard oxidation rate procedure is defined as follows: With a calibrated thermobalance, a sample pellet or composition is run at 80 p.s.i.g. air at 1450° F, at a rate of 10 s.c.f./hr. over a 10-minute span, and the weight loss continuously recorded and converted to conversion percent as follows:

$$X = 100(\Delta W / \Delta W')$$

where

X = percent conversion,
ΔW = measured change of weight, and
ΔW' = maximum possible change of weight due to the reaction $BaO_2 \rightleftarrows BaO + \frac{1}{2}O_2$ where the barium peroxide used in the composition is 100% pure.

The thermobalance is calibrated before starting the run. To calibrate, a known weight is suspended in the thermobalance. The recorder is turned on and a 10-minute steady trace is recorded on the recorder. The recorder is then turned off and another weight is suspended in the thermobalance. The recorder is turned on, and the output from the thermobalance is again recorded to obtain a 10-minute steady trace. From the fact that two known weights were used, the difference in the number of chart divisions between their resultant steady traces is used for calibrating the instrument.

After calibrating, the weights are removed from the thermobalance, and the standard run commenced. A standard-size basket, ½ inch in diameter and 4 inches long, made out of 150 mesh type 316 stainless steel wire screen, containing the sample, is suspended in the thermobalance. The sample is held in the upper "cold" zone of the equipment in an inert atmosphere of nitrogen.

The temperature in the lower zone is then raised to 1450° F. and maintained at this temperature for the rest of the test. Then, a flow of preheated air (10 s.c.f./hr.) is started through the lower zone and maintained throughout the test.

The pressure is raised to 80 p.s.i.g., and the sample is then lowered from upper cold zone to the "hot" zone. The recorder is turned on. The thermobalance output trace is recorded, and the position on the recorder is marked. When the Ba compound is in the peroxide form, the trace should indicate no change of weight.

Next, the pressure of air in the thermobalance is reduced to 2 p.s.i.g., the temperature being still maintained at 1450° F. The sample starts losing weight because of the reduction of $BaO_2$ in the sample to BaO. The reduction of the sample is carried on until the sample stops losing weight, indicating complete reduction of $BaO_2$ in the sample to BaO. The same flow rate of air is maintained in all the runs during the reduction part of the cycle. The resultant traces may be used to derive reduction rate curves.

Next, the pressure of the air in the thermobalance is increased to 80 p.s.i.g., and the temperature is maintained at 1450° F. Oxidation of BaO in the sample starts, and the sample starts gaining weight. Oxidation of the sample is continued until the sample stops gaining weight, indicating complete oxidation of BaO to $BaO_2$ in the sample. The same flow rate of air is maintained during this oxidation part of the cycle. The first 10 minutes of this oxidation period define our Standard Oxidation Rate Test.

Figure 3:
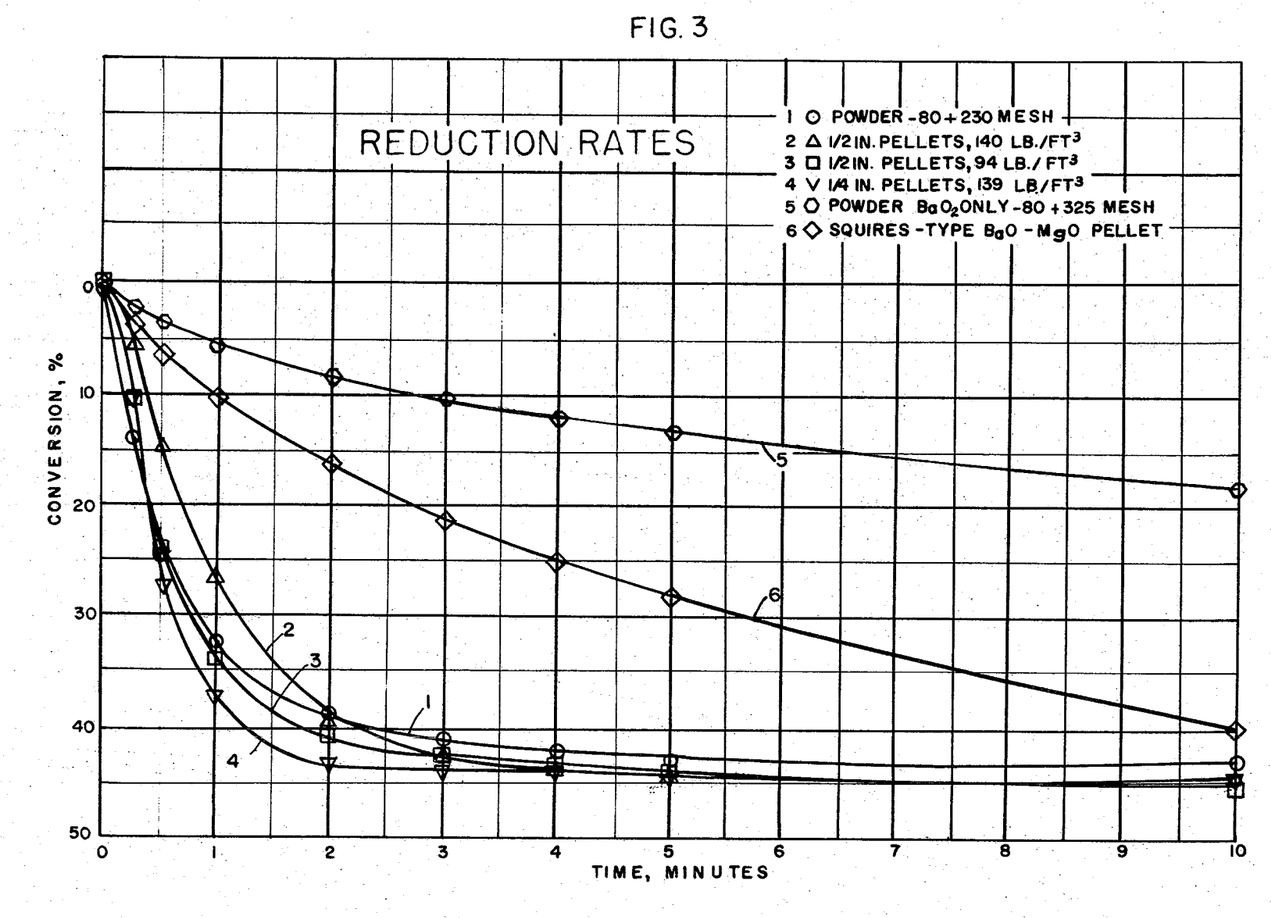
FIG. 3 graphically illustrates reduction conversion percentage as a function of time of various pellets.

Each of Runs 1–5 above were run in this manner and the weight increase tracings were used to generate curves 1–5 of FIG. 2. Likewise, the weight loss tracings upon reduction are plotted in FIG. 3 as conversion percentages, each curve being commenced at a conversion value of zero (y-axis). This represents the maximum oxidation level of the composition or pellet. As the reduction proceeds by conversion of $BaO_2$ to BaO, the curves drop, thus illustrating how much below the highest level of oxidation the compound or pellet is reduced under the standard conditions above-defined of temperature, air flow rate, pressure, and time.

The curves of the $DQL$-$BaO_2$ pellets and compositions of our invention all tend to reach the deepest reduction (FIG. 3) before four minutes, but the oxidation (FIG. 2) is not as fast. See especially curve 2 in FIGS. 2 and 3. This means that the oxidation seems to be the rate limiting step, rather than the reduction. This supports our above theory of operation of our pellet compositions starting with $BaO_2$ as providing a pre-filled oxygen acceptor site in the monolithic, porous pellet structure. The reduction curves also show even more strikingly the difference between Run 5/curve 5 for $BaO_2$ alone as compared to Runs 1–4/curves 1–4 of our $DQL$-$BaO_2$ compositions and pellets.

Returning to FIG. 2, we define $DQL$-$BaO_2$ pellets and compositions of this invention as having at least one oxidation conversion percent value X lying on or above curve A in the period 0–10 minutes when run under the above-defined standard conditions in a thermobalance calibrated as described above. This curve may be mathematically described by the equation:

(1) $\quad X = [1.477 + 61.01 t]^{\frac{1}{2}} - 1.2153$ at some time $t$, where $0 \leq t \leq 10$ minutes, and X is the conversion percentage at time $t$. Thus, where a $DQL$-$BaO_2$ composition, during the interval between 0 and 10 minutes in a Standard Oxidation Rate Test (SORT), has one or more oxidation conversion values equal to or larger than X as defined by Formula 1, it is a composition within the scope of our invention.

A more preferred range of $DQL$-$BaO_2$ pellet compositions give conversions on or above curve B in FIG. 2. These more preferred compositions have one or more SORT conversion percent values equal to or greater than X in accord with the following equation:

(2) $\quad X = 33.5 (1 - e^{-0.1800t})$ at some time $t$, where $0 \leq t \leq 10$ minutes.

Most preferred are those $DQL$-$BaO_2$ pellet compositions giving conversions on or above curve C in FIG. 2, i.e. which have one or more SORT conversion percent values greater than or equal to X in accord with Equation 3.

(3) $\quad X = 46.2 (1 - e^{-0.1883t})$ at some time $t$, where $0 \leq t \leq 10$ minutes.

By way of further comparison, a Squires-type BaO-MgO pellet as above-described was run on the thermobalance under SORT conditions and compared to both the dense, ¼" pellet of Run 4 above, and pure $BaO_2$ in powder form, Run 5 above, as follows:

TABLE 5.—COMPARATIVE CONVERSION PERCENT, OXIDATION

| Time, minutes: | Run 4—dense, ¼" DQL-BaO₂ pellet | Squires-type pellet | Run 5—pure BaO₂ powder |
|---|---|---|---|
| 0 | 0 | 0 | 0 |
| .5 | 15 | 6.1 | 4.0 |
| 1.0 | 29.3 | 10.5 | 6.2 |
| 2.0 | 42.5 | 16.8 | 9.6 |
| 3.0 | 44.5 | 21.7 | 12.5 |
| 4.0 | 45.1 | 25.3 | 14.5 |
| 5.0 | 45.5 | 28.3 | 16.5 |
| 10.0 | 46.5 | 39.3 | 23.3 |

These comparative results show that a typical

DQL-BaO₂ pellet of this invention has 100% greater conversion than pure $BaO_2$ (23.2/23.3×100) and 18% (7.2/39.3×100) better than Squires-type BaO-MgO pellets at the end of ten minutes. The results are more striking and more significant at three minutes, a more typical oxidation half-cycle time. Our pellet showed 256% greater conversion (32.0/12.5×100) than powdered $BaO_2$ and 105% greater than a Squires-type pellet (22.8/21.7×100).

EXAMPLE 4

This example shows bench scale reactor operation to test the lifetime activity of pellets in accordance with this invention. The reactor consisted of a 1¼" I.D. pipe containing a 15" deep bed (1.28 lbs.) of nominally ¼" x ¼" pellets prepared from a 70/30 weight percent DQL-BaO₂ mixture. The reactor and bed are maintained at approximately 1450° F.±50° F. by external heating means. In operation, preheated air is continuously passed from the bottom to the top of the bed, but the pressure is cyclically changed from about 80 p.s.i.g. to about 5 p.s.i.g. with automatic peripheral equipment. At high pressure, the barium oxide is oxidized to barium peroxide taking oxygen from the sweep air. This oxygen is then released to the sweep air during low pressure operation enriching it from 21 to above 30% oxygen.

Table 6 shows the results of a continuing life test over a period of about 40,000 cycles, through Mar. 7, 1972.

TABLE 6.—RESULTS OF LIFE TEST

| Cycle | Oxidation | Reduction |
| --- | --- | --- |
| Number | 39,567 | 39,567 |
| Time, min | 4.84 | 3.35 |
| Pressure, p.s.i.g | 80 | 5 |
| Temperature, °F | 1,480 | 1,430 |
| Air feed, s.c.f./hr | 9.42 | 10.64 |
| Space velocity, s.c.f./lb.-hr | 7.36 | 8.31 |
| Bed weight, lb | 1.28 | 1.28 |
| Bed height, inch | 15 | 15 |
| Bed diameter, inch | 1.27 | 1.27 |
| Oxygen content, percent, exit gas | 11.26 | 30.54 |
| Standard deviation, percent | 1.02 | 0.82 |
| Oxygen yield, overall: | | |
| S.c.f./cycle | 0.082 | 0.082 |
| S.c.f./lb. BaO₂-hr | 1.51 | 1.51 |

1.28 lbs. of the pellets of this invention have processed over 54.133 s.c.f. of air, enriching 26,561 s.c.f. from 21–30.54% average. The reactor has operated for over 242 days during which time nearly 40,000 cycles were completed. The equipment was shut down on 14 different occasions ranging in time from 20 minutes to 143.5 hours for the purpose of making repairs in the related mechanical equipment, but not to touch the bed. The bed was a static bed, and was not changed, raked, rabbled or otherwise interfered with during the test. In one of the shutdowns, after 21,500 cycles, it was necessary to completely cool the reactor in order to make repairs. The shutdowns have had no detrimental effects on the pellet activity. Just prior to shutdown or cooling, the bed was left in the oxidized state, with the barium being in the form of barium peroxide. The total down time due to bed failure or plugging is 0 hours, and total down time in connection with the related mechanical equipment failure is 362.2 hours, or less than 6.1%, a goal not often achieved in commercial operation. Since none of this was the contribution of bed failure, the process limitations lie in the mechanical equipment only.

In typical ranges of operation, the oxygen absorbing pellets of our invention are charged into a suitable reactor to form a static bed, and gradually heated up in air at 80 p.s.i.g. to the operating temperature range of from 1350–1600° F. before commencing the operation at the reduction (oxygen production) half of the cycle. Air is pumped through the reactor at a pressure in a range of from 1–50 p.s.i.a. at which time the BaO₂ of the initial mixture is converted by reduction to BaO+½O₂. The air is let in for from about 0.8 to 4.0 minutes, depending on the ratio of the DQL-BaO₂ mixture; the BaO₂ releases its combined oxygen to the purging air. The purging air leaves the reactor enriched to from 25–40% total oxygen concentration, and may be used as such directly in the various industrial processes described above. In the alternative, rather than purging the pellet bed with air, the inlet side of the reactor may be valved closed, and a vacuum drawn to produce substantially pure oxygen.

The reactor is then switched to the oxidation half of the cycle with air passing either co-currently or counter-currently, relative to the direction of flow during the reduction, through the bed of pellets at a pressure of from 40–200 p.s.i.a. at the bed temperature of from 1300–1550° F. During the oxidation half, the barium oxide then in the bed pellets combines with one-half O₂ to produce barium peroxide. The time range for this half of the cycle is substantially the same as for the reduction half of the cycle. The air depleted in oxygen (lean air) may be ejected as waste gas to the atmosphere, or may be used in further processes to recover the nitrogen gases therefrom. Or if desired, the enery values in the compressed lean air may be recovered.

The static bed of pellets does not require periodic raking or "turning" of the bed to move the pellets which are closest to the inlet into the interior of the bed. As with other Brin-type processes, the air let into the reactor should be previously stripped of both water vapor and carbon dioxide, for example, by passing the air through various guard chambers containing conventional CO₂ and water absorbents.

By "inert binder" we mean any binder which acts to promote adhesion of the DQL particles to the BaO₂ particles without substantially inactivating the oxygen accepting properties of the barium oxides. This includes a permissible range of some deactivation, but not to render the oxygen production below a SORT conversion percentage $X = [1.477 + 61.01t]^{\frac{1}{2}} - 1.2153$ under the conditions disclosed herein. This also includes binders which act as adjuvants.

In addition to being able to support larger beds, stronger pellets have the signicant advantage of being better able to resist crushing due to thermal contraction of the reactor. After filling the reactor with pellets, the reactor expands upon heating and the pellets settle into a more closely packed arrangement. However, upon cooling the pellets do not significantly rearrange themselves, i.e. expand back to the original packing arrangement. Rather, the pellets are compressed by the shrinking walls of the reactor, and the resultant relatively high loadings tend to crush the pellets producing fines which can accumulate to plug the bed. Even when broken, stronger pellets produces less fines and obviate the need for frequent bed cleaning or replacement.

It should be understood that within the spirit of this invention, one of ordinary skill in the art can make various modifications yet remain within the scope of this invention. We therefore wish the scope of the invention to be determined by the appended claims interpreted as broadly as the prior art will permit, and in the light of the specification if need be.

Figure 1:
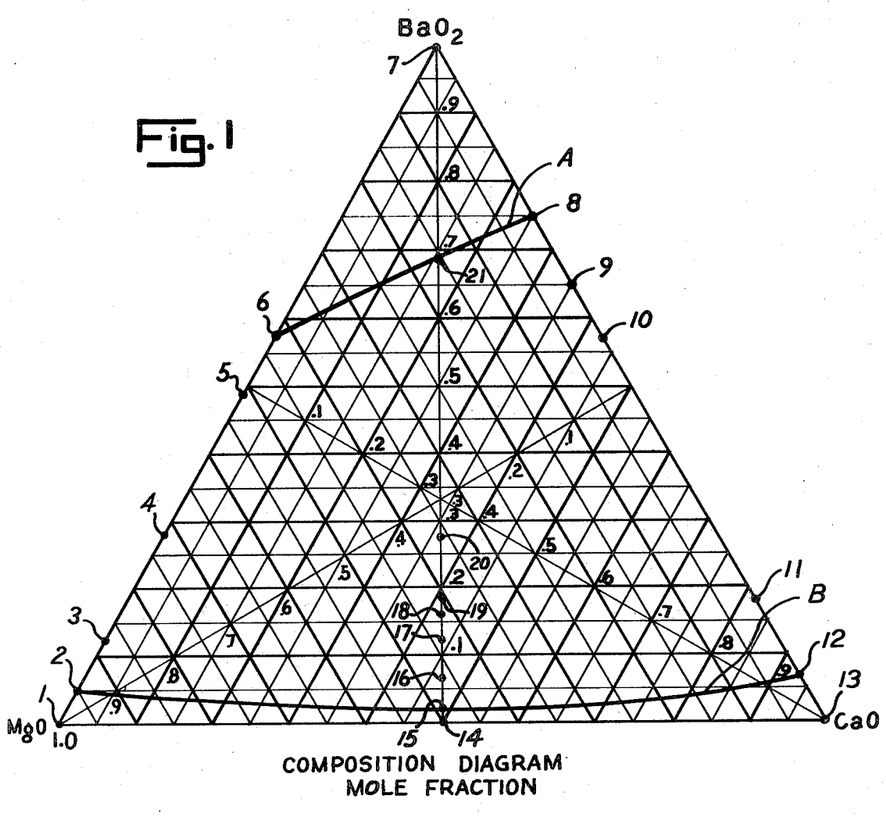
FIG. 1 is a trilinear diagram of the three components in the pellets of this invention as defined by the area between the lines A and B.

We claim:

1. A pellet for use in an oxygen accepting process consisting essentially of:
   (a) a mixture of BaO₂, MgO, and CaO which may also contain carbonate, the mole ratio of CO₂, resulting from the presence of said carbonate, to BaO₂ being less than 1.0, and in which the mole fractions of CaO, BaO₂ and MgO lie within the curves A and B in FIG. 1, and
   (b) said pellet has at least one Standard Oxidation Rate Test (SORT) conversion percentage value, $X \geq [1.477 + 61.01t]^{\frac{1}{2}} - 1.2153$ at time $t$, where $0 \leq t \leq 10$ minutes.

2. A pellet as in claim 1 wherein said mixture is a composition of BaO₂ with a binary compound of the oxides of Mg and Ca.

3. A pellet as in claim 2 wherein sad Mg and Ca oxides compound is a dolomitic quicklime derived from a naturally occurring dolomite.

4. A pellet as in claim 2 wherein the weight percent of said Mg and Ca oxides compound in the mixture is less than about 92%.

5. A pellet as in claim 3 wherein the weight percent of said dolomitic quicklime in the mixture is less than about 92%.

6. A pellet as in claim 5 wherein BaO₂ and dolomitic quicklime are discrete particles of size smaller than about 100 U.S. mesh and about 40 U.S. mesh respectively.

7. A pellet as in claim 6 wherein said dolomitic quicklime particles are smaller than about 80 U.S. mesh.

8. A pellet as in claim 1 wherein the density of said pellet is in the range of from 90 to 160 lbs./cu. ft.

9. A pellet as in claim 8 wherein the density of said pellet is in the range of from 120–150 lbs./cu. ft.

10. A pellet as in claim 1 having at least one SORT conversion percentage value, $X[\geq]\geq 33.5(1-e^{0.1800t})$ at time $t$ where $0\leq t\leq 10$ minutes.

11. A pellet as in claim 10 having at least one SORT conversion percentage value, $X\geq 46.2(1-e^{0.1833t})$ at time $t$ where $0\leq t\leq 10$ minutes.

12. A pellet as in claim 1 wherein the pellet has a mean crushing strength in excess of about 10 p.s.i.

13. A pellet as in claim 12 wherein the pellet has a mean crushing strength in excess of about 30 p.s.i.

14. A pellet as in claim 12 wherein said pellet is a heat tempered pellet.

15. A pellet as in claim 13 wherein said pellet is a heat tempered pellet.

16. A pellet as in claim 1 which is cylindrical in shape.

17. A pellet as in claim 16 wherein said cylinder ranges in size from 1/16" diameter to 1" diameter.

18. A pellet as in claim 17 wherein said cylinder ranges in size from 3/16" diameter to 5/8" diameter.

19. A pellet as in claim 16 wherein said cylinder ranges in length from 1/16" to 1".

20. A pellet as in claim 19 wherein said cylinder ranges in length from 3/16" to 5/8".

21. A pellet as in claim 1 devoid of binder.

22. A pellet as in claim 10 devoid of binder.

23. A pellet as in claim 11 devoid of binder.

24. A process for preparing an oxygen accepting composition comprising the steps of:
  (a) mixing $BaO_2$ with MgO and CaO which may also contain carbonate to provide a mixture in which the mole fraction of CaO, $BaO_2$ and MgO is within the curves A and B in FIG. 1,
  (b) maintaining the $CO_2$ content of said mixture resulting from the presence of said carbonate in a mole ratio of $CO_2$ to $BaO_2$ less than 1.0 and
  (c) compressing said mixture into the form of a pellet.

25. A process as in claim 24 wherein said MgO and CaO are in the form of a compound of the oxides of Mg and Ca.

26. A process as in claim 25 wherein said Mg and Ca oxides compound in a dolomitic quicklime derived from a naturally occurring dolomite.

27. A process as in claim 26 which includes the added step of: heating said dolomite or dolomitic quicklime prior to compression to reduce the $CO_2$ content thereof to a mole ratio of $CO_2$ to $BaO_2$ of less than 1.0.

28. A process as in claim 24 wherein said compressing step is carried out in the absence of a binder.

29. A process as in claim 26 wherein said compressing step is carried out in the absence of a binder.

30. A process as in claim 26 wherein said compressing step includes forming said pellets at pressures of between about 2,500 p.s.i. to 175,000 p.s.i.

31. A process as in claim 29 wherein said pressures are between about 25,000 p.s.i. to 125,000 p.s.i.

32. A process as in claim 24 which includes the added step of:
  (a) reducing the particle size of said $BaO_2$ to smaller than about 100 mesh prior to mixing with said CaO and MgO.

33. A process as in claim 25 which includes the added step of:
  (a) reducing the particle size of said Mg and Ca oxides compound to smaller than about 40 mesh prior to mixing with said $BaO_2$.

34. A process as in claim 26 which includes the added steps of:
  (a) reducing the particle size of said $BaO_2$ to smaller than 100 mesh prior to mixing with said CaO and MgO compound, and
  (b) reducing the particle size of said Mg and Ca oxides compound to smaller than 80 mesh prior to mixing with said $BaO_2$.

35. A process as in claim 24 which includes the added step of crushing the finished pellet to a particle size distribution suitable for use in fluidized bed operations so that no substantal separation of barium oxides from said particles occurs during fluidized operation.

36. A process as in claim 35 which includes the added steps of:
  (a) repelletizing said particles, and
  (b) recrushing said pellets produced in step (a) to said particle size distribution to obtain maximum uniformity of said Ba, Mg and Ca component distribution in said particles.

References Cited
UNITED STATES PATENTS

| | | | |
|---|---|---|---|
| 2,642,340 | 6/1953 | Martin | 423—218 |
| 3,310,381 | 3/1967 | Guerrieri | 423—218 |
| 3,579,292 | 5/1971 | Mullhaupt et al. | 423—218 |

OTHER REFERENCES

Moriarty, "The Effects of Catalytic or Promoter Oxides on the Brin Process," Proc. Iowa Acad. Sci., 77, 360–78 (Apr. 10, 1971).

HERBERT B. GUYNN, Primary Examiner

H. A. PITLICK, Assistant Examiner

U.S. Cl. X.R.

252—184, 188, 189, 190; 423—217, 218, 219